United States Patent
Kogan et al.

(10) Patent No.: US 6,820,069 B1
(45) Date of Patent: Nov. 16, 2004

(54) RULE COMPLIANCE SYSTEM AND A RULE DEFINITION LANGUAGE

(75) Inventors: Ilya Kogan, Union City, NJ (US); Mitchel Kraskin, Rye, NY (US); Boris Kanevskiy, Brooklyn, NY (US)

(73) Assignee: Banker Systems, Inc., Saint Cloud, MN (US)

( * ) Notice: Subject to any disclaimer, the term of this patent is extended or adjusted under 35 U.S.C. 154(b) by 379 days.

(21) Appl. No.: 09/595,841

(22) Filed: Jun. 16, 2000

Related U.S. Application Data

(60) Provisional application No. 60/164,632, filed on Nov. 10, 1999.

(51) Int. Cl.$^7$ .............................. G06F 17/00; G06N 5/02
(52) U.S. Cl. ............................ 706/46; 706/45; 706/47
(58) Field of Search .......................... 706/46, 45, 47; 707/100

(56) References Cited

U.S. PATENT DOCUMENTS

| | | | |
|---|---|---|---|
| 5,893,911 A | | 4/1999 | Piskiel et al. |
| 6,029,144 A | * | 2/2000 | Barrett et al. ............... 235/375 |
| 6,058,378 A | * | 5/2000 | Clark et al. ................... 705/37 |
| 6,385,595 B1 | * | 5/2002 | Kolling et al. ................. 705/40 |
| 6,513,019 B2 | * | 1/2003 | Lewis .......................... 705/35 |
| 6,601,044 B1 | * | 7/2003 | Wallman ....................... 705/36 |
| 6,615,188 B1 | * | 9/2003 | Breen et al. ................... 705/37 |
| 2002/0065752 A1 | * | 5/2002 | Lewis .......................... 705/35 |

OTHER PUBLICATIONS

Phil Feldman et al; Using Visual Basic 3; 1993; David P. Ewing; 316,444,416,417,447,461,542,600,640,642,649.*

* cited by examiner

*Primary Examiner*—Anthony Knight
*Assistant Examiner*—Joseph P. Hirl
(74) *Attorney, Agent, or Firm*—Stattler Johansen & Adeli, LLP

(57) ABSTRACT

A rule definition language ("RDL") and a memory server are used to determine compliance with rules, such as rules used in determining compliance in securities trading. The rules, global data and local data are loaded into system memory of the server. The global datum consists of parameters or values used to determine compliance with said rules. The query, submitted to the memory server, contains the local data that is used to determine compliance of that query with the rules. The query is executed by accessing server memory to utilize the local datum and the global datum, such that the server determines compliance with the rules from the memory of the server. Syntax for the RDL, which permits programming in a manner particularly suitable for compliance checking procedures, is also disclosed.

25 Claims, 12 Drawing Sheets

```
number Quantity;
number Price;
string SecurityId;                                      610
string SecurityType;
string AccountId;
string SecurityIssuer;
string SecurityAsset;
number AccountPMV;

string report [ id, param ];

bool CheckResult;
bool result;
```

```
'
' Market value calculation                             620
' number marketValue () once = Quantity * Price;
```

```
' Rule 1: No more than X% of the total assets
' in equities
'                                                      630 number r1_pos [ account ] global;
number r1_posValue () once =
   r1_pos [ AccountId ] += marketValue ();

bool rule1 ( string id, number X ) =
   report [ id, "result" ] =
   SecurityAsset == "EQT" &
   (
   report [ id, "Current Position" ] = r1_posValue (),
   report [ id, "Account PMV" ] = AccountPMV,
   r1_posValue () * 100 / AccountPMV > X
   );
```

Figure 6a

```
'
' Rule 2: No more than X% of the total assets in
' the securities of a single issuer.
'                                                    640 number r2_pos [ account, issuer ] global;
number r2_posValue () once =
   r2_pos [ AccountId, SecurityIssuer ] += marketValue()

bool rule2 ( string id, number X ) =
   report [ id, "result" ] =
   (
   report [ id, "Current Position" ] = r2_posValue (),
   report [ id, "Account PMV" ] = AccountPMV,
   r2_posValue () * 100 / AccountPMV > X
   );
```

```
'                                                    650
' Report routines.
' bool lineReport ( string param, string line ) =
   print ( "   ", param, ": ", line, newline );

bool ruleReport ( string id, string rep [ param ] ) =
   print ( " RuleId: ", id, newline ) &
   foreach ( rep, lineReport );

bool fullReport() =
   print ( "AccountId: ", AccountId, newline ) &
   foreach ( report, ruleReport ) &
   print ( newline );
```

```
'                                                    660
' Main check routine
'
bool rules () = rule1 ( "1", 20 ) || rule2 ( "2", 25 );
```

Figure 6b

```
705        document ::= ( statement | statement_group )*
```

```
710        statement_group ::= 'domain' identifier
     '{' statement* '}'
```

```
720        statement ::=
           (
           value_decl | table_decl | struct_decl | func_decl
           | assignment | print_statement | function_expression
           | instruction_statement
           ) ';'
```

```
730        letter ::= ['a' - 'z'] | ['A' - 'Z']
           digit ::= ['0' - '9']
           name_char ::= letter | digit | '_' | '@' identifier ::= ( letter | '_' ) name_char* number ::= digit + ( '.' digit* )?

string_char ::= [!'"']
           string ::= '"' string_char* '"'
```

```
740    type_base ::=
           'bool'
           | 'string'
           | 'number'
           | 'procptr'
           | 'void'
           | identifier
       type_spec ::= type_base '^'?
```

```
750    stor_spec ::= ( 'local' | 'global' ) ?
       value_decl ::= type_spec identifier stor_spec
```

```
760    dimentions ::= identifier ? ( ',' identifier ? )*
       table_decl ::= type_spec identifier '[' dimentions ']' stor_spec
```

Figure 7

```
810   field_list ::= field_decl ? ( ',' field_decl )*
      field_decl ::=
            type_spec identifier
            | type_spec identifier '[' dimentions ']'
      struct_decl ::= 'struct' identifier '(' argument_decls ')'
```

```
820   argument_list ::= argument_decl ? ( ',' argument_decl )*
      argument_decl ::=
            type_spec identifier
            | type_spec identifier '[' dimentions ']'
      func_type ::= ( 'once' | 'mutex' )?
      func_decl ::=
            type_spec identifier '(' argument_list ')' func_type
            '=' expression_with_commas
```

```
830   array_indexes ::= expression ( ',' expression )*
      array_element ::= expression '[' array_indexes ']'
      single_value ::= identifier
      struct_element ::= expression '.' identifier
      value ::=
            single_value
            | array_element
            | struct_element
            | 'bool'
            | 'string'
            | 'number'
            | 'procptr'
```

```
840   struct_initializer ::= '{' initializers '}'
      initializer ::= struct_initializer | expression
      initializers ::= initializer ? ( ',' initializer? )*
```

```
850   assignment ::=
            value '=' expression
            | value '=' struct_initializer
            | value '^=' expression
            | value '+=' expression
            | value '-=' expression
            | value '*=' expression
            | value '/=' expression
            | value '&=' expression
            | value '|=' expression
```

Figure 8

```
910   expression_with_commas ::= expression ( ',' expression )*
      expression ::=
            value
            | '(' expression_with_commas ')'
            | assignment
            | expression '?' expression ' ::=' expression
            | '-' expression
            | '!' expression
            | expression '+' expression
            | expression '-' expression
            | expression '*' expression
            | expression '/' expression
            | expression '&' expression
            | expression '|' expression
            | expression '&&' expression
            | expression '||' expression
            | expression '>' expression
            | expression '<' expression
            | expression '>=' expression
            | expression '<=' expression
            | expression '==' expression
            | expression '!=' expression
            | 'true'
            | 'false'
            | number
            | string
            | 'newline'
            | 'null'
            | function_expression
```

```
920   arguments ::= expression ( ',' expression )*
      function_expression ::=
            identifier '(' arguments? ')'
            | 'print' '(' arguments ')'
            | 'printf' '(' expression ',' expression ',' expression ')'
            | 'foreach' '(' expression ',' identifier ')'
            | 'firstid' '(' expression ')'
            | 'firstid' '(' expression ',' array_indexes ')'
            | 'exists' '(' expression ',' array_indexes ')'
            | 'clear' '(' expression ')'
            | 'execute' '(' expression ')'
            | 'rerun' '(' identifier ')'
            | 'domain' '(' ')'
            | 'optimize' '(' ')'
            | 'optimize' '(' expression ')'
```

Figure 9

| 1010 instruction_statement ::= 'reset' |

| 1020 print_statement ::= '>>' arguments |

Figure 10

RULE COMPLIANCE SYSTEM AND A RULE DEFINITION LANGUAGE

CROSS-REFERENCES TO RELATED APPLICATIONS

The application claims the benefit of U.S. Provisional Application No. 60/164,632, filed Nov. 10, 1999, entitled "Rule Compliance System With A Rule Definition Language."

BACKGROUND OF THE INVENTION

1. Field of the Invention

The present invention is directed toward the field of rule compliance systems, and more particularly to a rules compliance system that integrates a memory database with a rules definition language.

2. Art Background

In general, "rules" are implemented in compliance systems to check parameters or data input to the system. Compliance systems have application for use in analytic systems, including a variety of risk management and surveillance technologies. Compliance systems also have application for use in securities trading. In general, in securities trading, there are a number of rules imposed by regulators (i.e., Securities and Exchange Commission) regarding trading. For example, institutional investors have regulatory obligations with regard to trading. Furthermore, money managers, such as managers of mutual funds, also have guidelines for securities transactions. A portfolio manager for a large institutional investor may impose specific guidelines or rules regarding the diversification of the portfolio. For example, the institutional investors may wish to limit the amount of securities held for a particular industry, define a minimum trading amount, list securities that are not to be purchased for that institutional investor, etc. In addition, a portfolio owner may impose on a broker a number of limitations regarding the type and quantity of securities for trading.

The rules regarding securities trading and other applications have become so complicated that a computer is required to ensure full compliance. To this end, it is necessary to develop a computer based compliance system that effectively implements complex rules for use in high volume analytic applications. One implementation for enforcing rules includes the use of a server. In this configuration, a client generates a query that includes the data necessary to ascertain the compliance of the rules. In response, the server executes the query by determining whether the parameters of a query are in compliance with the underlying rules. Thus, for this configuration, the compliance server operates similar to a database system, wherein a query is received and an answer (e.g., a compliance report) is generated.

Typically, in client/server database applications, interpretive languages, such as the standard query language ("SQL"), are used. In general, query languages provide a general infrastructure to request data stored in the underlying database. Typically, the data is stored in tables in a persistent datastore (e.g., a hard disk drive). To execute the query, code is loaded from the persistent datastore into the computer system memory. Then, the query is interpreted, and the code executes an input/output ("I/O") operation to the persistent datastore to extract rows of data from database tables. In early compliance engine design, this technique was adequate because the rules were relatively static (i.e., the rules did not change very often), and a persistent datastore was the only available storage medium that could handle the massive amount of data involved in compliance rules applications. However, with increasingly complex compliance rule applications, the SQL server approach is extremely slow because this technique requires extensive I/O access to the persistent datastore. Even with today's advancements in technology, these I/O transactions result in unacceptable delay for use in compliance engines. Therefore, be traditional database approach is an unacceptable environment for high volume time critical analytic transactions, such as securities trading.

Another approach to compliance engine implementation involves the use of third generational languages, such as C++, and a persistent datastore. The use of third generational languages to check or implement rules results in faster execution than the SQL database approach. Although this approach has adequate performance at run time, it is difficult to update and change the underlying rules. Typically, in compliance applications, such as securities trading, the underlying rules change on a daily basis. To change a rule using a third generational language requires programming the rule into the existing code, and recompiling the new code for subsequent execution at run time. However, this process has some dangerous consequences if errors are introduced into the new code. In addition, this process is slow because the new code must pass through quality assurance checks prior to reuse. For example, if a programming error is introduced as a result of a new rule, the entire compliance engine may be rendered inoperable. In addition, the new code, after compiling and linking, must be implemented on the client's computer. This may introduce potential compatibility problems. If the client is at a disparate location from the compliance engine provider, the need for continual updates may be an impractical solution. Accordingly, rapid changes in the rules renders the compiled code environment an inadequate solution for most compliance engine applications, including pre-trade compliance applications.

Accordingly, it is desirable to develop a compliance engine that is fast and efficient, so as to eliminate or reduce I/O transactions. It is also desirable to implement a compliance engine that is flexible, so as to allow rapid deployment of new or different underlying rules.

SUMMARY OF THE INVENTION

A memory server executes queries to determine compliance with rules. The rules, which comprise computer readable instructions, are loaded into system memory of the server. Also, global datum, for use in executing the query, is loaded into system memory of the server. The global datum consists of parameters or values used to determine compliance with the rules. To determine compliance with the rules, the memory server receives a query. The query contains local datum used to determine compliance of that query with the rules. In response, the local datum is stored in server memory. Thereafter, the query is executed by accessing server memory to utilize the local datum and the global datum, such that the server determines compliance with the rules from the memory of the server. The memory server has application for use in determining compliance for securities trading.

A rule definition language ("RDL") is used to implement a compliance system. The syntax of the RDL permits programming in a manner particularly suitable for compliance checking procedures. In one embodiment, the RDL syntax provides a means to declare local variables. A local variable is used to store query data, in system memory, for temporary use of the data during execution of that query. The RDL syntax also provides a means to declare global variables. A global variable is used to store data, in system memory, for use of the data during execution multiple queries in a session. In other embodiments, the RDL syntax provides a means to declare multi-dimensional associative arrays for accessing the multi-dimensional arrays.

BRIEF DESCRIPTION OF THE DRAWINGS

FIGS. 6a and 6b illustrate several blocks of code for implementing rules in an example query.

FIG. 7 illustrates syntax for the rule definition language of the present invention.

FIG. 8 illustrates additional syntax in accordance for the rule definition language of the present invention.

FIG. 9 illustrates further syntax for the rule definition language of the present invention.

FIG. 10 illustrates additional syntax for the rule definition language of the present invention.

DETAILED DESCRIPTION

The disclosure of U.S. Provisional Application No. 60/164,632, filed Nov. 10, 1999, entitled "Rule Compliance System With A Rule Definition Language", is hereby expressly incorporated by reference.

Compliance Server Overview

In general, the compliance server of the present invention encodes rules using a novel interpretive language. In one embodiment, the compliance server is implemented using a "memory database." With the memory database, the rules and all necessary data are resident in system memory to enhance performance of the compliance check.

Figure 1:
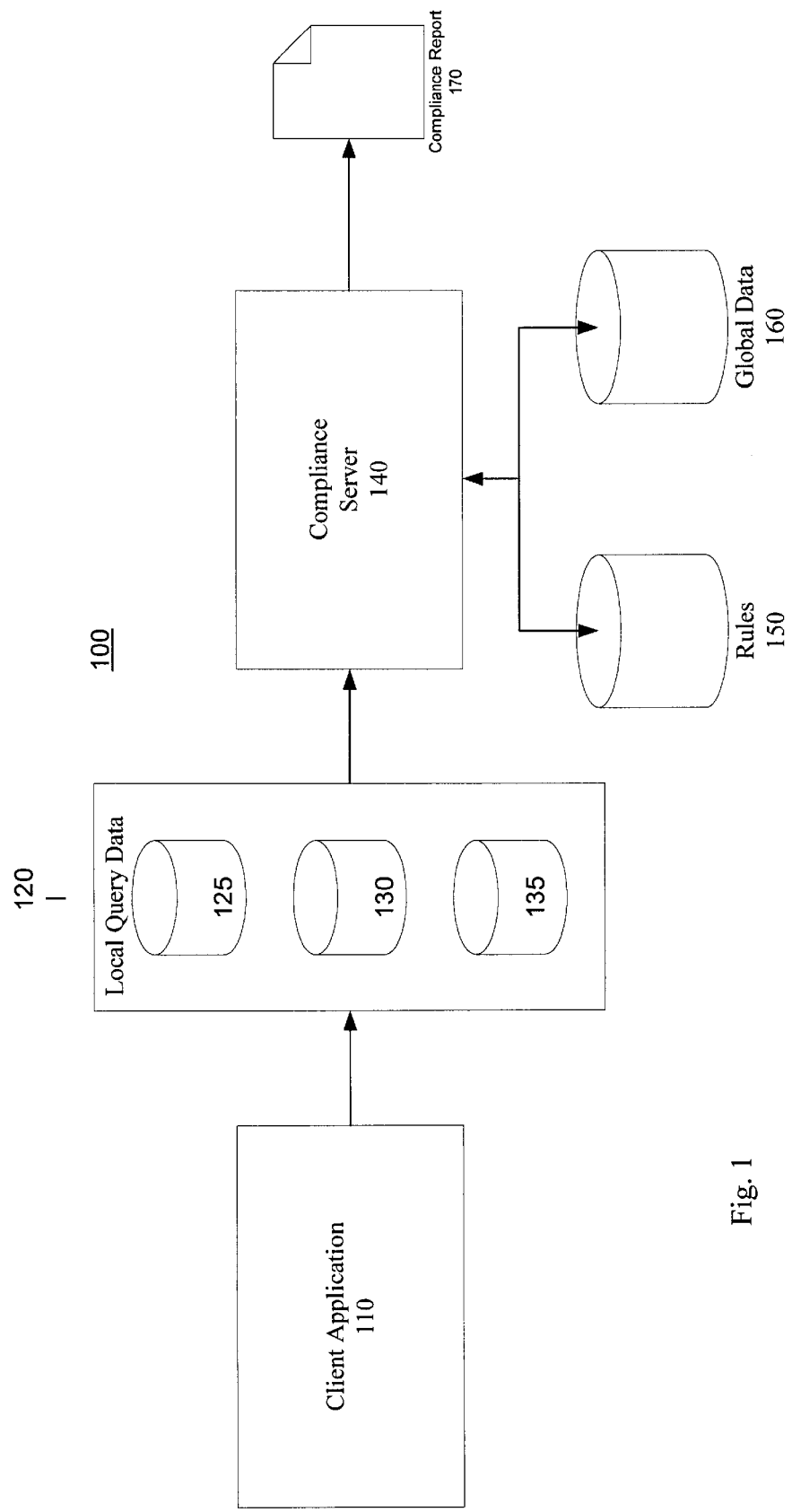
FIG. 1 is a block diagram illustrating one embodiment for a system that incorporates the compliance server of the present invention.

FIG. 1 is a block diagram illustrating one embodiment for a system that incorporates the compliance server of the present invention. In general, compliance system 100 determines, from local data, global data, and rules, whether an input query violates one or more predetermined rules. For the embodiment of FIG. 1, the compliance system 100 operates in a client-server environment. In one application for a client-server environment, a client application, such as a software application running on a desktop computer, submits queries to a server. The server may be geographically remote from the client. The server then generates a response to the queries. In a compliance system, the server determines compliance and generates a compliance report (i.e., the query is in compliance with the underlying rules or the query is out to of compliance with the underlying rules).

Although the present invention is described for use in a client server environment, any implementation of the memory database and rule definition language may be used without deviating from the spirit or scope of the invention. For example, the client application and compliance server may be integrated into a single software application, running as either an integrated client application or an integrated server application.

The compliance server 140 includes, at a minimum, system memory, processor, network interface capabilities, and input/output access to a persistent datastore. A general-purpose computer for implementing the compliance server is described below in conjunction with FIG. 11. As shown in FIG. 1, a client application, labeled client application 110, generates queries 120. As described more fully below, the client application may comprise any type of application, wherein data is checked against one or more rules or parameters. In general, the queries provide data to conduct a compliance check against one or more rules. For the example of FIG. 1, three queries are shown. The queries 120 contain local query data (local query data 125, 130, and 135). Specifically, the local query data defines the parameters to conduct the compliance check. For example, in a pre-trading application for financial securities, the local query data consists of parameters of the trade (e.g., security identification, price, quantity of shares, etc.).

The compliance system 100 also includes a compliance server 140. In general, compliance server 140 receives, prior to run time, a plurality of rules 150 and global data 160. To conduct a compliance check, the compliance server 140 receives the local query data 120, and using the rules 150, global data 160 and local query data for the associated query, generates a compliance report 170 as shown in FIG. 1. The compliance report 170 identifies whether the local query data 120 is in conformance to the rules 150. For example, the compliance report 170 may identify each rule and identify whether the submitted query conforms to that rule.

Figure 2:
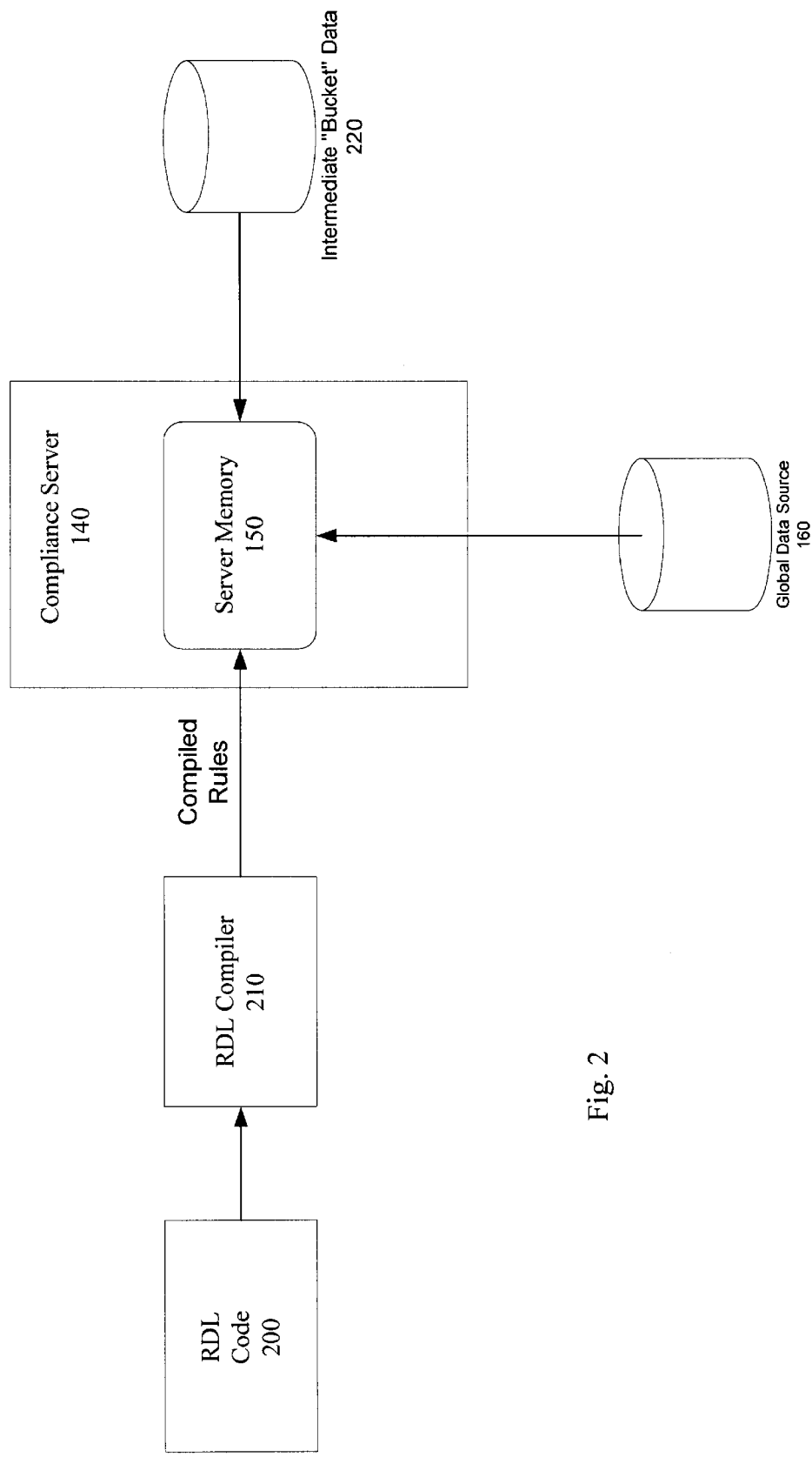
FIG. 2 is a block diagram illustrating one embodiment for pre-configuring the compliance server of the present invention.

FIG. 2 is a block diagram illustrating one embodiment for pre-configuring the compliance server of the present invention. For this embodiment, a rule definition language ("RDL"), an interpretive language, is used to define one or more rules. The rule definition language is designed so as to minimize programming overhead and to maximize the efficient implementation of business rules for the programmer. To this end, the rule definition language simplifies programming tasks associated with implementing rules in the rules compliance environment. Thus, the programmer may focus on implementing business rules, and the compiled RDL code, operating in the compliance server, provides the most efficient implementation for those rules.

In general, rules are declarations of variables and statements. The declarations consist of definitions of new data variables and code procedures, and the statements consist of execution requests. For example, statements may comprise logic statements (e.g., Boolean operations performed on one or more variables), arithmetic or algebra operators, flow control operators, or data access operators. The statements may reference any earlier declared elements. Rules and the rule definition language, including examples, are described more fully below.

As shown in FIG. 2, one or more rules, defined by a rule definition language code 200, are input to a rule definition language ("RDL") compiler 210. In general, the RDL compiler compiles the syntax of the RDL code to generate executable code. The executable code is shown as "Compiled Rules" in FIG. 2. Specifically, to pre-configure the compliance server 140, the compiled rules are loaded into the server memory 150. For the example of FIG. 2, a global data source 160 stores data pertinent to the compliance check. Although FIG. 2 graphically illustrates global data stored in a persistent datastore, the global data may originate from any source, including data received over a network. Also, to pre-configure the compliance server 140, global data is entered into memory. In general, global data, as used herein, connotes data use to conduct the compliance check. However, the global data is not specific to a particular query. For example, in the pre-trading application, global data may comprise information regarding one or more accounts for an institutional investor.

The pre-configuration process further includes loading or calculating intermediate "bucket" data. Intermediate data, as used herein, connotes data that is continually updated to reflect a sum or total for a parameter. Intermediate data is not specific to a particular query. Although intermediate "bucket" data 220 is shown originating from a different source than global data source 160, the data may initially originate from the same source. However, the difference is that intermediate data, once stored in compliance server 140, is revised to reflect activity regarding the underlying application. For example, intermediate data may comprise a value that signifies the quantity of a particular security held in a portfolio. As securities are bought and sold for that portfolio, the intermediate data is updated to reflect the current quantity of securities held. Accordingly, prior to executing queries, the compliance server stores, in system memory, compiled rules, global data, and intermediate data.

Figure 3:
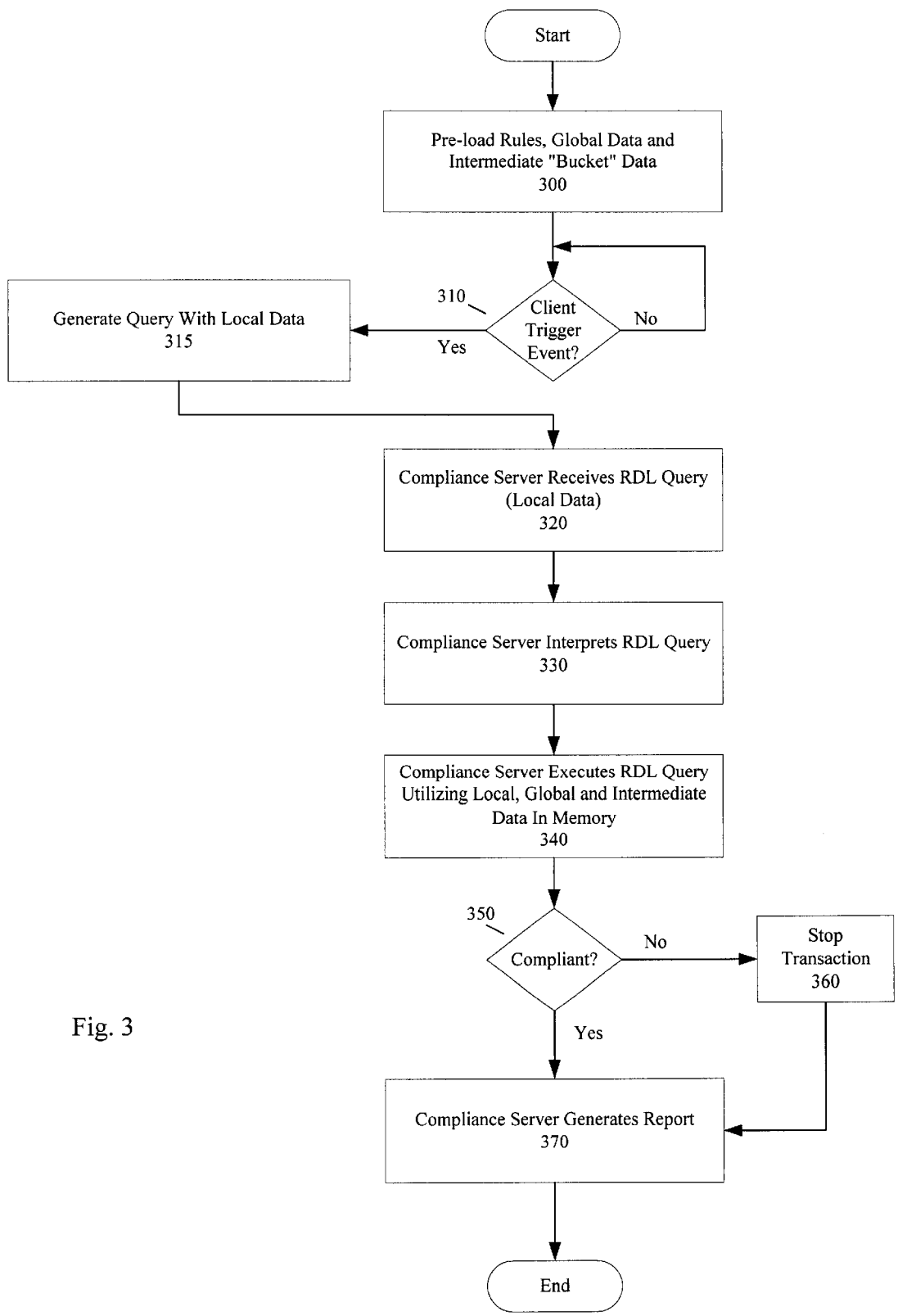
FIG. 3 is a flow diagram illustrating one embodiment for implementing compliance rules.

FIG. 3 is a flow diagram illustrating one embodiment for implementing compliance rules. To configure the compliance server, rules, global data and intermediate data are stored in system memory of the compliance server (block 300, FIG. 3). The compliance server is now ready to process queries. If an event is triggered in the client application that requires a compliance check, the client application or interface agent generates a query (blocks 310 and 315, FIG. 3). In one embodiment, to form a query, the client application collects all the input information necessary to execute the check from either a database (e.g., global database 160) or from the pre-loaded memory tables (e.g., memory tables 430, FIG. 4). For example, in the pre-trading application, this data may include information regarding the trade, the security, the account, the industry, etc. Also, in alternative embodiments, the client application 110 may interface with the compliance server 140 via an interface agent. For this embodiment, the interface agent acts as a mediator between the client application and the compliance server. To generate a query for this embodiment, the interface agent receives "raw" data from the client application, and utilizes data resources to collect all the input information necessary to execute the compliance check.

The compliance server receives the query, including the local query data (block 320, FIG. 3). In response, the compliance server interprets the query, including parsing the local data for storage in system memory (block 330, FIG. 3). The pre-compiled rules are executed in the compliance server, utilizing the local, intermediate and global data, from system memory (block 340, FIG. 3). If the query is compliant (i.e., the local query data does not violate a rule), a report is generated (blocks 350 and 370, FIG. 3). In some applications, the compliance server may serve as part of a process that determines whether the next step of the process is executed. For example, in the pre-trading application, the output of the compliance server may be an application that initiates the trade. For this example, if the query is compliant, the process continues (i.e., the trade is allowed to proceed). Alternatively, if the query is not compliant, then the transaction is stopped, and a compliance report is generated (blocks 350, 360, and 370, FIG. 3). As described more fully below, the syntax of the RDL permits executing all operations, so as to generate a complete compliance report.

Memory Database

Figure 4:
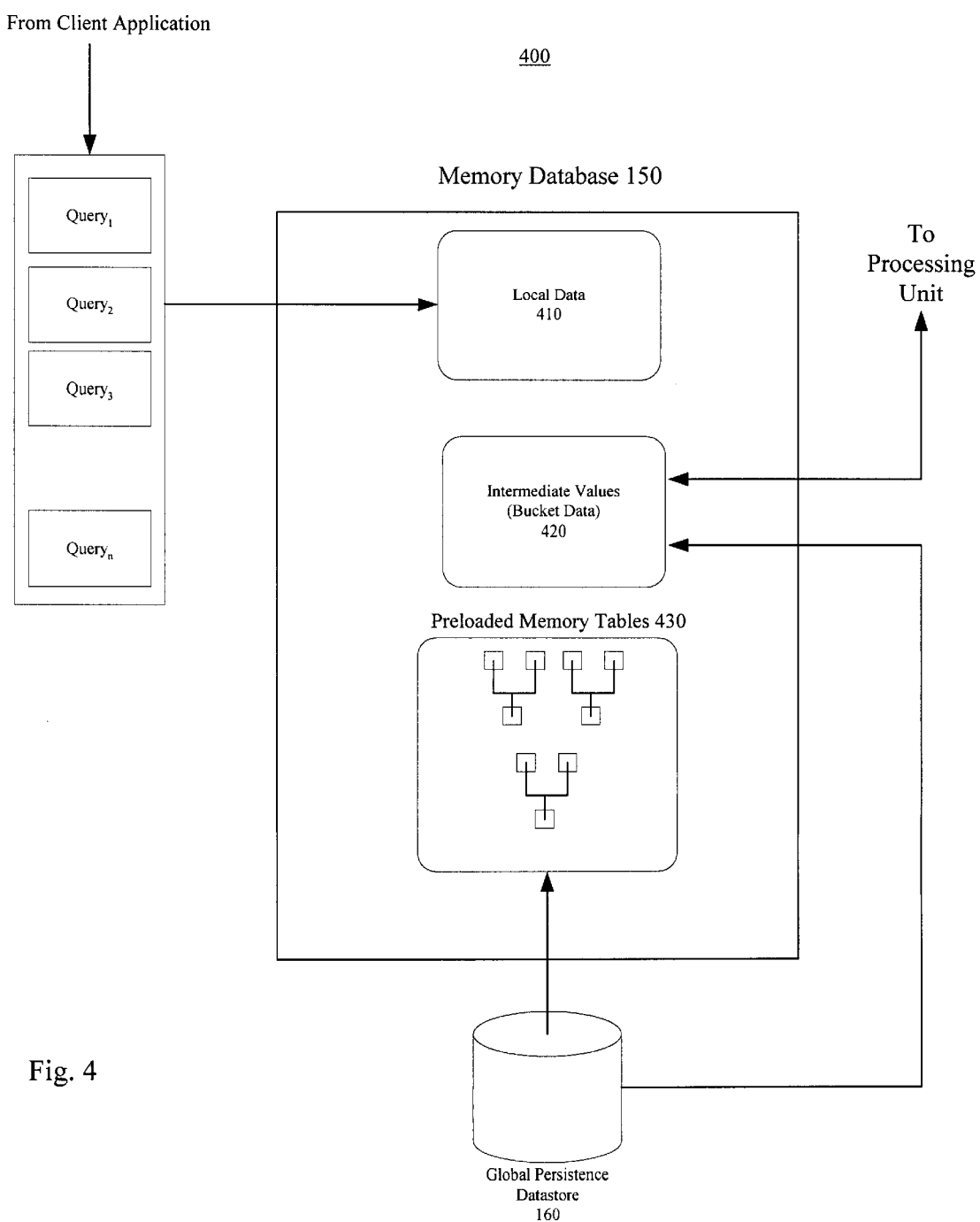
FIG. 4 is a block diagram illustrating one embodiment for the memory database of the present invention.

FIG. 4 is a block diagram illustrating one embodiment for the memory database of the present invention. The memory database 150 (i.e., system memory for the compliance server 140) stores, in addition to executable rules, data necessary to conduct the compliance check. For the embodiment shown in FIG. 4, the memory database 150 includes local data 410, intermediate values (e.g., bucket data) 420 and pre-loaded memory tables 430. As described above, the local data 410 consists of data from queries (query$_1$, query$_2$, query$_3$, and query$_n$). The RDL syntax provides a means to declare "local" variables. From this declaration, this data is only resident for execution of an associated query. As is well known in the art of computers, the system memory manager allocates blocks of memory in accordance with memory requirements of the software programs resident in memory. For a typical application, local data resides in the memory database 150 in accordance with the variables declared in the RDL code. The intermediate bucket data 420, which remains resident throughout multiple queries, is also shown as part of the memory database 150.

The RDL syntax provides memory data structure support. This implementation permits storage of data in the form of either single variables, in numeric or symbolic form, or multi-key lookup tables of variables. In general, the pre-loaded memory tables 430 replace the persistent storage of the database tables use in a standard query language ("SQL") implementation. Instead, these potentially complex data structures are stored in system memory. The pre-loaded memory tables 430 support the storage of multi-key level or "tree structure variables", as graphically illustrated in FIG. 4. In one embodiment, the tree structure or multi-key level variables are stored using a form of an associative array. For example, an array may have two dimensions. In general, for a multi-dimensional array, a single index addresses multiple entries or values. The number of index values at each level may be different.

In the pre-trading application, multi-dimensional arrays have applications for use in the calculations involving multiple accounts. For example, a single index may address multiple values, wherein each value is associated with a different account. An example associative array is described more fully below. Accordingly, as illustrated in FIG. 4, the memory database 150 provides the necessary faculties to process queries to conduct compliance checks without the use of external persistent datastores. As a result, the compliance server does not require executing slow I/O operations.

Security Pre-Trading Compliance Application

Figure 5:
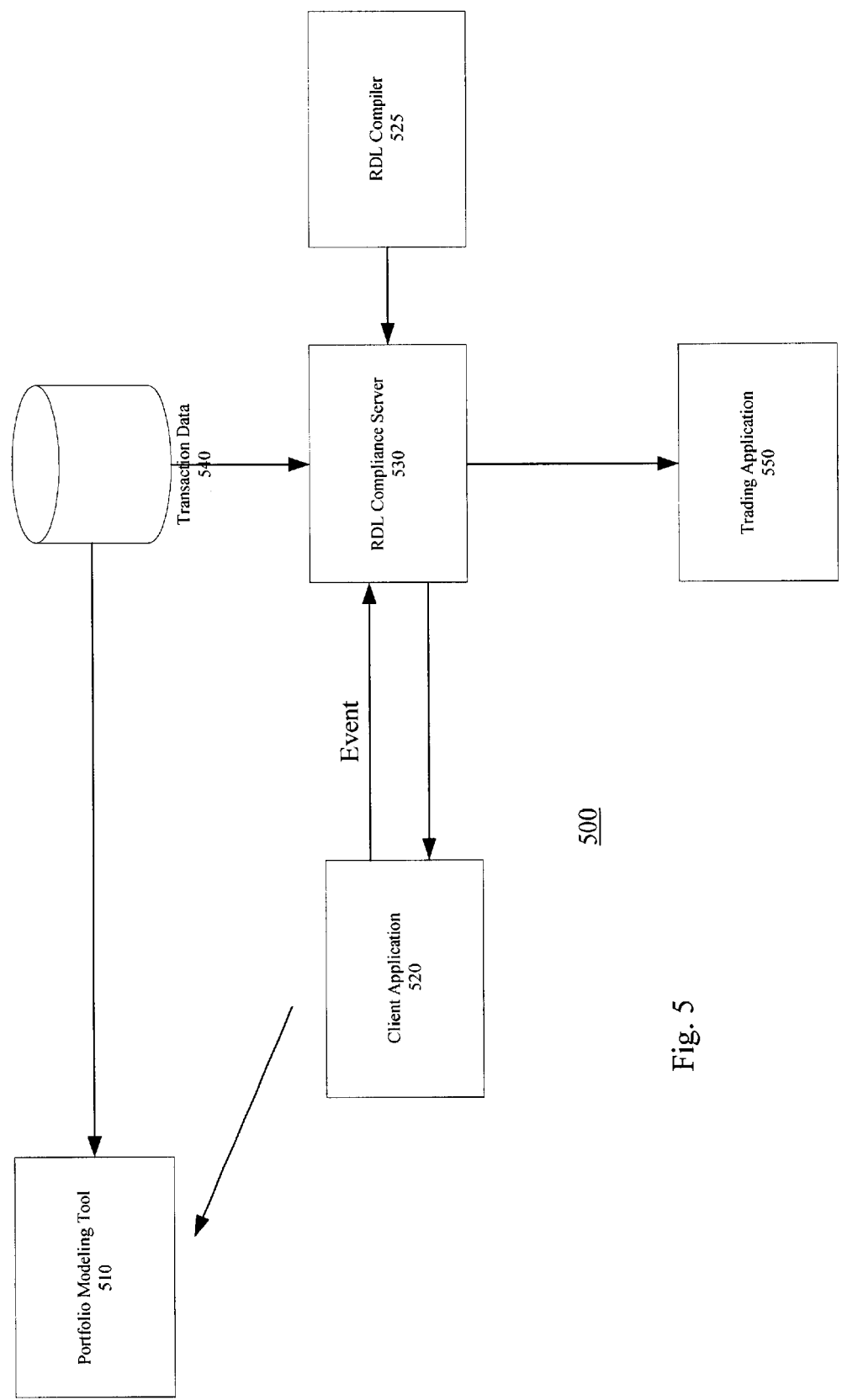
FIG. 5 is a block diagram illustrating one embodiment for a pre-trading compliance application utilizing the RDL compliance server of the present invention.

FIG. 5 is a block diagram illustrating one embodiment for a pre-trading compliance application utilizing the RDL compliance server of the present invention. For this embodiment, a pre-trading system 500 includes a client application 520 and a RDL compliance server 530. As discussed above, client application 520 and compliance server 530 operate in a client server environment, whereby the client application 520 generates queries for execution in the compliance server 530. Specifically, for this embodiment, the client application 520 generates an event to ascertain whether criteria, set forth in the query, is in compliance with pre-defined rules. Also, in other embodiments, an interface agent may be use to interface the client application 520 to the compliance server 530. In pre-trading compliance applications, rules are both complex and dynamic. For example, in one embodiment, new or different rules are input to the compliance server 530 on a daily basis. The frequent updating of rules is effectuated by pre-compiling new RDL code, and loading the new RDL code into system memory of compliant server 530. This operation is illustrated in FIG. 5 through the depiction of the RDL compiler 525 coupled to the compliant server 530. In addition, data may be input to the system several times a day. For example, new global data may be required to reflect ever-changing market conditions and portfolio assets for a particular account. The input of data on a frequent basis is illustrated by the coupling of transaction database 540 with compliant server 530.

The compliance server 530 may operate as a stand-alone application, or it may operate in conjunction with one or more applications. For the example of FIG. 5, a portfolio-marketing tool 510 is or operates in conjunction with client application 520. In general, the portfolio-modeling tool 510 is an aid to an analyst to help the analyst select securities for trading (e.g., select stocks for buying or selling). An RDL programmer programs, using the RDL language, rules to check whether the securities transaction is in compliance with government regulations, portfolio modeling parameters, client parameters, or financial manager parameters.

For the pre-trading compliance application, portfolio-modeling tool 510 may generate an event to buy or sell financial securities. In response to the event, the client application (e.g., portfolio modeling tool), either directly or through an interface agent, obtains any necessary data from the RDL compliant server (i.e., server's memory structure). The client application or interface agent then formulates a query. In response to the query, the RDL compliance server 530 generates a compliance report to detail the compliance results. In one embodiment, the compliance report is transferred to the client application. Thereafter, the user of the client application software, such as a portfolio manager, determines from the report whether to execute the trades (i.e., the subject of the query). Alternatively, or in addition to, the compliance report may be transferred to a trading application 530. The trading application 530 may initiate the securities trade.

The compliance server of the present invention may operate as a stand-alone tool or application. Alternatively, the compliance server may be fully integrated into client or server applications. For example, the RDL compliance server software may operate in conjunction with a portfolio-modeling tool. For this example, the compliant server specifies whether securities selected for trading by the portfolio-modeling tool are in compliance with the underlying applicable rules.

An RDL Example

The following example illustrates operation of the compliant server in accordance with one embodiment of the present invention. For this example, the compliant server is used in a pre-trading application. Table 1 contains initial trade information entered into the client application system.

TABLE 1

| | |
|---|---|
| Quantity | 100 Shares |
| Security Ticker | IBM |
| Security Type | Common Stock |
| Price | $100.00 |
| Account | Rich Man |

The client application, or interface agent, using supplementary tables from the trading system together with trade information of Table 1, generates an RDL query. Specifically, the input query for the client application is set forth in Table 2 below.

TABLE 2

| | |
|---|---|
| Quantity | 100 |
| Price | $100.00 |
| SecurityId | IBM |
| SecurityType | CS |
| AccountId | Rich Man |
| SecurityIssuer | IBM |
| SecurityAsset | EQT |
| AccountPMV | 10,000,000 |
| CheckResult | Rules( ); result = fullReport( ); |

For the above example, the "SecurityIssuer" parameter identifies the company that issued the security that is the subject of the trade. The parameter "AccountPMV" connotes the portfolio market value of the client's account (e.g., rich man's account). The parameter "SecurityAsset" identifies the type of asset for the corresponding security. For this example, the "SecurityAsset" type is "equity." As will be realized by one skilled in the art of pre-trading compliance systems, this example simplifies the amount of supplementary data corresponding to the trade, the traded security, and the account. Furthermore, in some embodiments, security and account information is pre-loaded into the compliance server so as to minimize the amount of data transmitted across the network (i.e., the network that couples the client application and compliant server). Accordingly, additional parameters or supplementary parameters may be used in a pre-trading compliance application without deviating from the spirit or scope of the invention.

The last two lines of the query (i.e., the last entry of Table 2) are function calls. The first function call executes the compliance check, and the second function call generates the compliance report. However, the report generation routine may be called from the rule compliance routine itself, or the report generation routine may be executed at a later date. For example, the rule compliance routine may store the compliance data to persistent storage, and a report generation routine may be executed utilizing this data.

The RDL compliant server receives the query, parses it, and executes the query using the memory database. FIGS. 6a and 6b illustrate several blocks of code for the rules resident in the memory database for this example query. The code is segmented into blocks for explanation purposes only. Block 610 of FIG. 6a contains declarations of the variables that are "local" for the query. Values of those variables have a life cycle of the query itself. In RDL, it is not mandatory that the declarations are located at the head of the file. For this example, input trade parameters are declared, as well as variables to hold the results of the compliance check. A true response indicates that the trade violates the compliance.

The declaration of the variable "report" shown in block 610 of FIG. 6a illustrates multidimensional arrays using RDL. For this example, the multidimensional array is two-dimensional. For this embodiment, strings index the multidimensional arrays. Typically, the strings are referred to by names. Table 3 illustrates an example two-dimensional array for the "report" declaration.

TABLE 3

| Rule Id | Parameter Name | Parameter Value |
| --- | --- | --- |
| 1 | Result | False |
| 1 | Current Position | 1000 |
| 1 | Account PMV | 10,000,000 |
| 2 | Result | True |
| 2 | Current Percentage | 20 |
| 2 | Account PMV | 10,000,000 |
| 2 | Maximum Percentage | 40 |

An element of the array may be addressed as report ["1", "result"]. A shown in Table 3, the parameter value for this entry is "false." As illustrated in Table 3, any number of indexed values may be generated at any given level. Specifically, for this example, report ["1"] has three index values, whereas report ["2"] has for index values.

The block of code 620 in FIG. 6a contains a helper function entitled "marketValue." The special marker "once" is used in this declaration. As described above, with the special marker "once", a function is only executed once per query. This function is utilized to change a variable that should only occur once per query.

The code block 630 of FIG. 6a has a declaration of a rule. Specifically, this rule sums up all equity positions for the associated account, and checks the resulting value against the market value of the portfolio. If the result is greater than a predetermined percentage, then the compliance is violated. In one embodiment to implement this rule, all positions for all securities are available. The code updates a position for the security traded, and sums up all equity positions to produce the resulting value. This implementation depends upon the number of positions in the portfolio because the execution time would increase exponentially with the number of positions. Alternatively, in another embodiment, intermediate data, also referred to as "bucket" data, is utilized to implement this rule. Specifically, whenever a security is traded, this rule checks whether the security is an equity security. If so, the value of the equity security is added to the bucket, and the check is performed.

The first line of code in block 630 of FIG. 6a declares an array of numbers called r1_pos. For this example, this value holds current positions for the buckets. Thus, there is one value for every account. Also note that this array is marked with a "global" marker. This means that the state of the array is persistent after execution of an associated query.

The code block of 630 also includes a declaration of the function entitled "r1_posValue." The purpose of this declaration is to update the bucket the first time the rule is executed, and then return the value the next time the function is called within the same query. To this end, the function is declared with a "once" marker. Specifically, RDL arrays have a feature to assign a default value to an element if the element is being accessed for the first time in a query. Because of this feature, a value may be incremented or decremented without concern as to whether it was the first operation for that query. The first time the value for the account is accessed, the value is added to the array and assigned a default value of zero.

The next line of code in the code block 630 contains a declaration of a rule body. The RDL syntax provides a means to generate a "comma" operation. This rule contains a comma operator. In general, the comma operation permits a developer to perform a calculation or call a function, and then discard return values. For example, a call to an operation may include the variables "x, y, z", and the return value from the call may only include "z." The code block 630 also depicts the prohibition of a short circuit function (described below).

The code block 640 of FIG. 6b has a declaration of another rule. This rule declaration includes a position array. Specifically, this rule calls for accumulation of investments in a single issuer. Thus, all positions in securities issued by the same issuer are added and checked against the market value of the entire portfolio. This is achieved by adding another index to the position array. Instead of adding values for the entire account, only securities with the same issuer are added together.

The code block 650 of FIG. 6b contains example report generation routines. For this embodiment, after execution of all the rules for this account, an array entitled "report" is generated. In general, the array "report" contains results together with other details. The report generation routine utilizes the RDL operator, entitled "foreach." As discussed above the "foreach" function executes user-supplied functions for each element of an array.

The code block 660 of FIG. 6b contains the definition of the main check routine. The main check routine consists of calls to individual rule functions with parameters specific for each rule. This example snippet of code utilizes the prohibitive short circuit function. Thus, rules are executed regardless of whether one rule in a chain returns a "true" or a "false." If any of the rules returns a true, indicating a violation, the result of the overall compliance checked is also true The following results were produced by the compliance routines for transmission to the client application (or interface agent).

```
AccountId: Rich Man
    Rule Id: 1
        Result: False
        Current Position: 1000
        Account PMV: 10000000
    Rule Id: 2
        Result: False
        Current Position: 1000
        Account PMV: 10000000
```

The Rule Definition Language

The formal grammar of RDL is set forth herein using a simple Extended Backus-Naur Form (EBNF) notation. Each block in the grammar defines one symbol, in the form 'symbol ::=expression'. Within the expression on the right-hand side of a grammar block, the following expressions are used:

['a'–'z'] Matches any character with a value in the range indicated;

[!'a'–'z'] Matches any character with a value outside of the range indicated;

A? Matches expression A or nothing; optional A;

A B Matches A followed by B;

A|B Matches A or B but not both;

A+ Matches one or more occurrences of A; and

A* Matches zero or more occurrences of A.

FIG. 7 illustrates selected RDL syntax. The RDL document is a collection of statements and/or statements groups. Block 705 (FIG. 7) shows the syntax for declaring a document with statement and statement groups. The RDL document is a collection of statements and/or statements groups as shown on Block 705 (FIG. 7.)

A statement group or a domain consists of zero or more statements. A statement group is used to group identifiers together. Identifiers, located inside the domain, may be referenced by their names, while identifiers outside of the domain may be referenced in the form of name@domain. Block 710 (FIG. 7) shows syntax for declaring statement groups. Statements are defined as one or more elements (described below). Block 720 (FIG. 7) shows the syntax for declaring statements. As shown in block 720, the recitation of elements is finalized by a semicolon.

There are three distinct atomic elements in the RDL: identifiers, numbers, and strings. In FIG. 7, block 730 shows the syntax for declaring several atomic elements used in RDL. The first character of an identifier is a letter or an underscore character. Numbers may have mantissa after the significant digits. Strings may have any characters (including new-line or other special characters) enclosed in double quotation marks.

The rule definition language supports the declaration of variables to support multiple types. Variables in RDL may be declared as "bool", "string", "number" (e.g., floating point numeric type equivalent to the type double in C++), procptr, void, or user-defined structure. Variables of any type, except of a structural type, are automatically converted into a string type. Variables of type, "void", may be used in any expression that calls for a specific type. The void type is converted to the default value for that type (e.g., empty string for the string type, false for the Boolean and zero for the number). In RDL, a variable of any type may be assigned to the variable of type "void". If this occurs, the value is ignored. Otherwise RDL is a type safe language, and automatic conversions between types are not allowed.

By adding a '^' character at the end, a user may declare a reference to a variable. References in RDL are "safe." With a "safe" variable, an operation may be performed any time with a variable of reference type, even before initialization. Before initialization, a reference points to the variable of type void. If an element reference was removed from the original location (e.g., in case of a table element), the reference variable still points to the same value, and the element is not removed from memory till the reference variable is reassigned.

RDL supports atomic variables. In FIG. 7, block 750 shows the syntax for declaring atomic variables for use in RDL. An atomic variable is declared by specifying its type and storage. The RDL syntax provides syntax to declare variables "local" and syntax to declare variables "global." As shown in block 750, the storage specification (i.e., "stor_spec") provides for the declaration of both "local" and "global" variables. If the storage specification is omitted, then the default storage is "local." As discussed above, the value of a local variable persists only during execution of the query. The local variable is discarded after the query is executed. Global variables persist during the entire life cycle of the memory server. Global variables are shared by all queries.

RDL supports the declaration and use of table variables. In general, tables are collections of elements identified by one or more keys. In FIG. 7, block 760 shows the syntax for declaring table variables for use in RDL. A programmer, using the syntax of RDL, may assign names to the key values. Although the assignment of names to the key values results in enhanced readability of the program, the RDL syntax does not require assignment of names to key values. For example "number test[first,second];" is equivalent to "number test[,];". This RDL syntax declares a table with two keys that contain numeric values. The keys are of the type string, and the keys are case sensitive. For example "test ["A", "B"]=1;" will assign an element associated with keys "A" and "B" a value of one.

FIG. 8 illustrates additional syntax for the rule definition language of the present invention. The RDL supports the declaration of structures. Block 810 shows the syntax for declaring structures. A structure may have an unlimited number of fields of both atomic and table types. Once declared, a structure may be used as a type in further declarations.

The RDL also supports the declaration of functions. Block 820 (FIG. 8) shows the syntax for declaring functions. Functions may have zero or more arguments of atomic or table types. Arguments are passed by a reference. The arguments may be modified in the function's body. However, if a constant is passed as an argument, an attempt to modify it does not result in a change to the argument. Also, the body of the function is a one-line expression that calculates the result. In order to create functions with more than one expression, a comma operator is used.

When declaring functions, functions may be marked 'mutex' or 'once'. Functions marked 'once' are executed once per query. After the first execution, the result is cached, and subsequent calls return the same value (i.e., the cached value). If the function is called a second time during the same query, the cached value is retrieved, and the function does not re-calculate the value. The "once" marked function may be used in conjunction with the intermediate "bucket" data described above.

Functions marked 'mutex' are mutually exclusive. With a mutually exclusive function, only one instance of the function may be executed at a time. Mutually exclusive functions are used to make complex modifications of shared atomic data, so as to prevent possible conflicts when executing multiple different queries.

Block 830 of FIG. 8 illustrates syntax for variable accesses. When accessing table elements, the syntax provides the ability to access both a single element and a sub-table. When less than declared indexes are used, the resulting expression is a sub-table. The sub-table may be passed as an argument to a function or it may be assigned to a table with a similar signature. When a type name, including user-defined structures, is used by itself, the result is a temporary variable. The temporary variable may be passed to a function as an argument. Elements of structures are accessed by using a '.' operator. Expressions on the left are confined to structural type expressions, although these expression may be any type of expression, including a function call.

Block 840 of FIG. 8 illustrates syntax for structure initializers. Structure initializers, when used with the assignment operator (block 850, FIG. 8), may be used to assign values to an entire structure, including substructures. For example "test={ "aaa", "aaa", { "bbb", "bbb"}};" assigns a value to a structure that has two strings and a sub-structure that, in turn, has two strings.

Block 850 of FIG. 8 illustrates syntax for assignment operators. Assignment operators are performed with structures, atomic types and tables alike. There are various forms of operators that perform some mathematical or Boolean operation together with the assignment. For example "a+=2;" adds two to a numeric variable. The operator '^=' performs referential assignment. It assigns a new value to a reference. The expression "number^a; number b; a ^=b;" assigns a variable 'a' to point to variable 'b'. The operator '^=' may be used with an expression of a referencing type on the left.

FIG. 9 illustrates further syntax for the rule definition language of the present invention. The RDL supports a full set of primitive arithmetic and Boolean operators. Primitive arithmetic and Boolean operators are well known in the art and will not be described further. Block 910 of FIG. 9 illustrates syntax for declaring expressions. A conditional operator, '?', evaluates expressions on the left, and based on the result of this expression, a second or third expression is evaluated and returned as a result of the operator.

There are two pairs of logical operators '&' and '|'. A single '|' and '&' operators perform short-circuiting. In addition, the RDL syntax provides a means to fully execute all operations in the RDL code. Typically, in compliant applications, the result of each function or operation is required in order to compile a complete report of the compliance regarding each underlying rule. Typically, programming languages operate such that if a first logical operation in a series of logical operations necessitates a conclusion for the entire series of logical operations, then only the first logical operation is executed. For example, if a first operation is joined with a second operation with a logical "AND", and the first operation is "FALSE", then the entire expression is "FALSE." The act of only executing a portion of an operation necessary to render the conclusion is referred to as a "short circuit." RDL provides the functionality to execute all operations regardless of whether a previously executed sub-operation or expression necessitates the result. To disable the "short circuit" function, RDL provides, through the syntax "&&" and "||", a no short circuit logical "AND" operation and a no short circuit logical "OR" operation, respectively. Accordingly, when the no short circuit functions are executed, the results of operations from within a string of operations are stored in a report table for generation of a compliance report (e.g., compliance port report 170, FIG. 1).

A special constant 'null' or type void is used in expressions of all types to assign a default value. A constant 'newline' is used (e.g., printing) to represent a new-line character that may be different on different platforms.

RDL supports several built-in functions. Block 920 of FIG. 9 illustrates syntax for declaring function expressions (e.g., 'print', 'printf', 'foreach', 'firstid', 'exists', 'clear', 'execute', 'rerun', 'domain', and 'optimize'). The 'print' function inputs an unlimited number of arguments and prints them from left to right. The 'printf' function, which includes the arguments "expression for printing", "field width", and "field precision", is mostly used to print numbers.

The 'foreach' function is used to enumerate items in a table. The first argument consists of the type "table", and the second argument consists of a function identifier used to enumerate the elements. The 'foreach' function has a signature that is compatible with the table being enumerated. The first parameter is a string and it receives a key. The second parameter consists of a sum-table (with one less key than the original) or an atomic type if the table being enumerated has only one key. For example, if an array is declared as:

number test[index1, index2, index3];

Then the enumerator function is declared as:

bool enumerator (string id, number name [index2, index3]).

The function has a Boolean return type. If a function terminates enumeration, it returns a 'false', or else all of the elements are enumerated.

The 'firstid' function returns a first found key value. The second form uses indexes to address a table. For the convenience of programming, even though an empty string is a valid key value when used by this function, an empty index value is interpreted as "any value", and the first available key value is returned.

The 'exists' function performs a function similar to the 'firstid' except it returns 'true' if the element exists in the table and 'false' otherwise. The 'clear' function removes all elements from a table. The 'execute' function is used to execute a function, and is used with variables of type 'procptr.' The 'rerun' function schedules a function labeled 'once' for a rerun. In a rerun function, the next time the function is executed its value is evaluated again. The 'domain' function returns current domain postfix. The 'optimize' function is used to optimize a search algorithm for a particular table. The 'optimize' function is used only with variables of table type. This function may be used with large tables of relatively infrequently changed data to optimize searching immediately after a big data insertion.

FIG. 10 illustrates further additional syntax for the rule definition language of the present invention. The RDL includes an instruction statement as shown in block 1010 of FIG. 10. The 'reset' instruction resets the contents of the server. When a reset is executed, all functions, global, and local data are removed from memory. The instruction statement may be used as the first statement of a script.

The RDL includes a print statement as shown in block 1022 of FIG. 10. The print statement is equivalent to the call to the 'print' function. In one application, the print statement is used primarily for debugging to reduce the number of characters typed.

Although the RDL is described using the above syntax, modifications and alterations may be made without deviating from the spirit and scope of the invention.

Computer System

Figure 11:
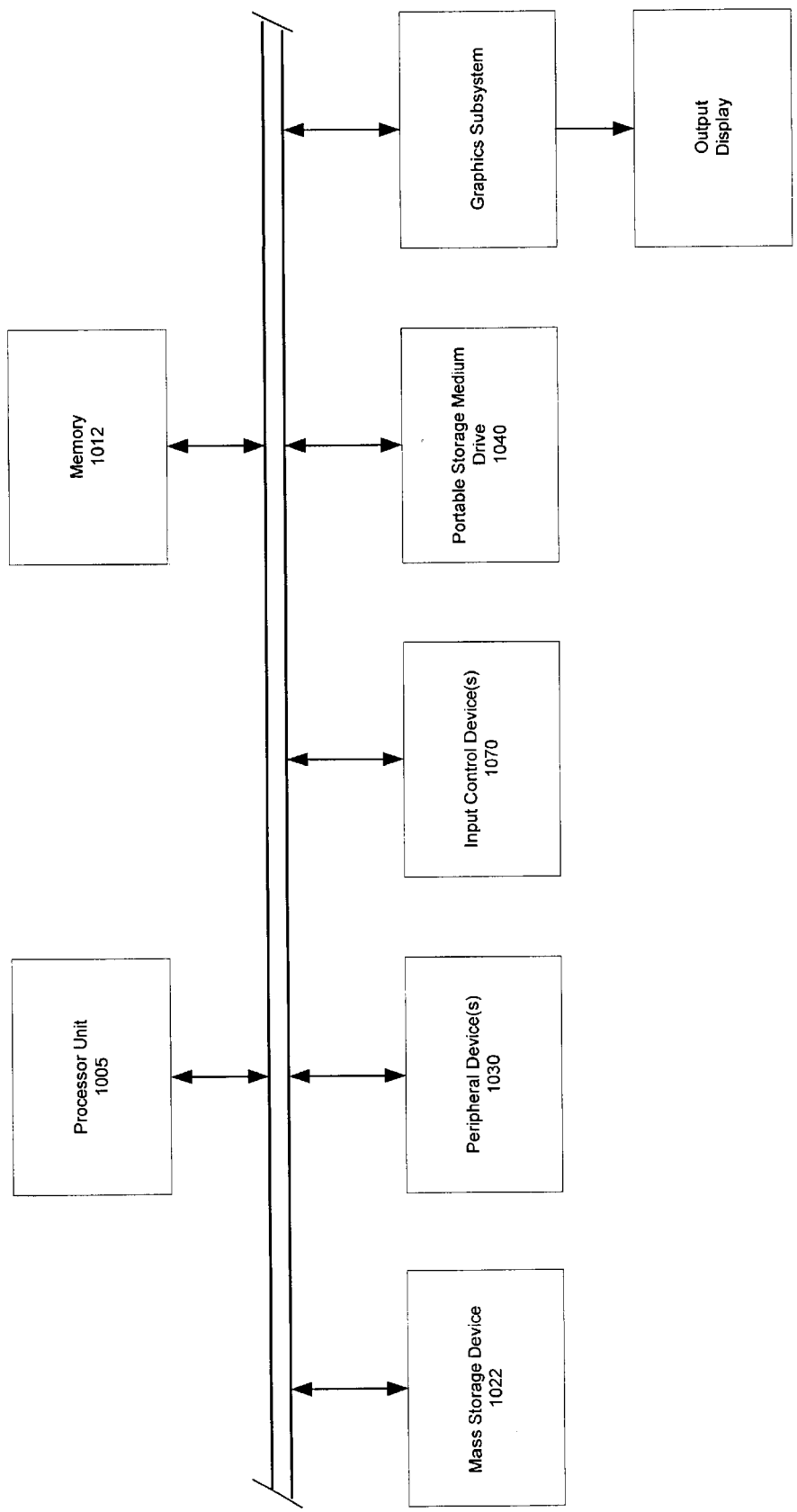
FIG. 11 illustrates a high-level block diagram of a general-purpose computer system for implementing the compliance system of the present invention.

FIG. 11 illustrates a high-level block diagram of a general-purpose computer system for implementing the compliance system of the present invention. A computer system 1000 contains a processor unit 1005, main memory 1012, and an interconnect bus 1025. The processor unit 1005 may contain a single microprocessor, or may contain a plurality of microprocessors for configuring the computer system 1000 as a multi-processor system. The main memory 1012 stores, in part, instructions and data for execution by the processor unit 1005. The main memory 1012 may include banks of dynamic random access memory (DRAM) as well as high-speed cache memory.

The computer system 1000 further includes a mass storage device 1022, peripheral device(s) 1030, portable storage medium drive(s) 1040, input control device(s) 1070, a graphics subsystem 1050, and an output display 1060. For purposes of simplicity, all components in the computer system 1000 are shown in FIG. 11 as being connected via the bus 1025. However, the computer system 1000 may be connected through one or more data transport means. For example, the processor unit 1005 and the main memory 1012 may be connected via a local microprocessor bus, and the mass storage device 1022, peripheral device(s) 1030, portable storage medium drive(s) 1040, graphics subsystem 1050 may be connected via one or more input/output (I/O) busses. The mass storage device 1022, which may be implemented with a magnetic disk drive or an optical disk drive, is a non-volatile storage device for storing data and instructions for use by the processor unit 1005. In the software embodiment, the mass storage device 1022 stores the compliance system software for loading to the main memory 1012.

The portable storage medium drive 1040 operates in conjunction with a portable non-volatile storage medium, such as a floppy disk or a compact disc read only memory (CD-ROM), to input and output data and code to and from the computer system 1000. In one embodiment, the compliance system software is stored on such a portable medium, and is input to the computer system 1000 via the portable storage medium drive 1040. The peripheral device(s) 1030 may include any type of computer support device, such as an input/output (I/O) interface, to add additional functionality to the computer system 1000. For example, the peripheral device(s) 1030 may include a network interface card for interfacing the computer system 1000 to a network.

The input control device(s) 1070 provide a portion of the user interface for a user of the computer system 1000. The input control device(s) 1070 may include an alphanumeric keypad for inputting alphanumeric and other key information, a cursor control device, such as a mouse, a trackball, stylus, or cursor direction keys. In order to display textual and graphical information, the computer system 1000 contains the graphics subsystem 1050 and the output display 1060. The output display 1060 may include a cathode ray tube (CRT) display or liquid crystal display (LCD). The graphics subsystem 1050 receives textual and graphical information, and processes the information for output to the output display 1060. The components contained in the computer system 1000 are those typically found in general purpose computer systems, and in fact, these components are intended to represent a broad category of such computer components that are well known in the art.

For the software implementation, the compliance system is software that includes a plurality of computer executable instructions for implementation on a general-purpose computer system. Prior to loading into a general-purpose computer system, the compliance system software may reside as encoded information on a computer readable medium, such as a magnetic floppy disk, magnetic tape, and compact disc read only memory (CD-ROM). In one hardware implementation, the compliance system may comprise a dedicated processor including processor instructions for performing the functions described herein. Circuits may also be developed to perform the functions described herein.

Although the present invention has been described in terms of specific exemplary embodiments, it will be appreciated that various modifications and alterations might be made by those skilled in the art without departing from the spirit and scope of the invention.

What is claimed is:

1. A method for executing a query in a computer to determine security trading compliance with a plurality of rules, said method comprising the steps of:

loading, into system memory of a computer, a plurality of rules, wherein said rules comprise computer readable instructions for execution in said computer, wherein a query comprises a plurality of parameters and wherein said rules comprise at least one statement for evaluating said parameters of said query;

loading, into said system memory of said computer a plurality of global datum for use in executing said query, including the steps of generating at least one pre-loaded memory table for storage in said system memory and loading said global datum in said pre-loaded memory table, wherein at least one global datum comprises parameters or values used to determine compliance with said rules for said query;

thereafter, receiving at least one query for determining compliance with said rules loaded in said system memory, said query further comprising at least one local datum used to determine compliance of a corresponding query with said rules;

storing said local datum in said system memory of said computer; and executing, in response to said query, said rules including accessing said system memory to utilize said local datum and said global datum, wherein said computer determines compliance with said rules from said system memory of said computer.

2. The method as set forth in claim 1, further comprising the steps of:

receiving a first set of data for use in executing said query; calculating, from said first set of data, intermediate data; and storing said intermediate data in said system memory of said computer for use in determining compliance of queries with said rules.

3. The method as set forth in claim 1, wherein:

generating at least one pre-loaded memory table comprises generating at least one multi-dimensional associative array;

and loading a plurality of global datum for use in executing said query comprises loading said global datum into said multiple dimensional associative array.

4. The method as set forth in claim 1, wherein the step of loading into system memory a plurality of rules further comprises the steps of:

receiving a rule definition language input that defines said plurality of rules; and compiling said RDL input to generate said computer readable instructions.

5. The method as set forth in claim 1, further comprising the step of:

receiving periodically updated versions of said global data for use in executing said query.

6. The method as set forth in claim 1, wherein:

the steps of loading said global datum, said local datum and said rules into system memory of a computer comprises the steps loading said global datum, said local datum and said rules into system memory of a server; and the step of receiving at least one query for determining compliance with said rules comprises the step of receiving said query from a client computer of said server.

7. The method as set forth in claim 1 wherein the step of loading a plurality of rules comprises the step of loading compliance rules for security trading.

8. A method for specifying rules in a computer implemented security trading compliance system, said method comprising the steps of:

providing a syntax in a rule definition language to declare at least one local variable in memory, wherein a local variable comprises a declaration for storage, in system memory, query data for temporary use of said query data during execution of a query: and providing a syntax in said language to declare at least one global variable, wherein a global variable comprises a declaration for storage, in system memory, data resident for use during execution queries: and providing a syntax through said language to declare pre-loaded memory tables.

9. The method as set forth in claim 8, wherein the step of: providing a syntax through said language to declare pre-loaded memory tables comprises the step of further providing a syntax through a programming language to declare multi-dimensional associative arrays for accessing said multi-dimensional arrays.

10. The method as set forth in claim 8, further comprising the steps of:

providing a syntax to declare an operation comprising a plurality of Boolean operands to execute a plurality of variables; and interpreting said syntax to execute Boolean operations subsequent to a final logical determination of said variables.

11. The method as set forth in claim 8, further comprising the step of providing a syntax to mark a function as mutually exclusive.

12. The method as set forth in claim 8, further comprising the step of providing a syntax to mark a function for execution a single time.

13. A computer readable medium comprising a plurality of instructions, which when executed by a computer, causes the computer to execute the security trading compliance steps of:

loading, into system memory of a computer, a plurality of rules, wherein said rules comprise computer readable instructions for execution in said computer, wherein a query comprises a plurality of parameters and wherein said rules comprise at least one statement for evaluating said parameters of said query;

loading, into said system memory of said computer a plurality of global datum for use in executing said query, including the steps of generating at least one pre-loaded memory table for storage in said system memory and loading said global datum in said pre-loaded memory table, wherein at least one global datum comprises parameters or values used to determine compliance with said rules for said query;

thereafter, receiving at least one query, for determining compliance with said rules loaded in said system memory, said query further comprising at least one local datum used to determine compliance of a corresponding query with said rules;

storing said local datum in said system memory of said computer; and executing, in response to said query, said rules including accessing said system memory to utilize said local datum and said global datum, wherein said computer determines compliance with said rules from said system memory of said computer.

14. The computer readable medium as set forth in claim 13, further comprising the steps of:

receiving a first set of data for use in executing said query;

calculating, from said first set of data, intermediate data; and storing said intermediate data in said system memory of said computer for use in determining compliance of queries with said rules.

15. The computer readable medium as set forth in claim 13, wherein;

generating at least one pre-loaded memory table comprises generating at least one multi-dimensional associative array; and loading a plurality of global datum for use in executing said query comprises loading said global datum into said multiple dimensional associative array.

16. The computer readable medium as set forth in claim 13, wherein the step of loading into system memory a plurality of rules further comprises the steps of:

receiving a rule definition language input that defines said plurality of rules; and compiling said RDL input to generate said computer readable instructions.

17. The computer readable medium as set forth in claim 13, further comprising the step of:

receiving periodically updated versions of said global data for use in executing said query.

18. The computer readable medium as set forth in claim 13, wherein:

the steps of loading said global datum, said local datum and said rules into system memory of a computer comprises the steps loading said global datum, said local datum and said rules into system memory of a server; and the step of receiving at least one query for determining compliance with said rules comprises the step of receiving said query from a client computer of said server.

19. The computer readable medium as set forth in claim 13, wherein the step of loading a plurality of rules comprises the step of loading compliance rules for security trading.

20. A computer readable medium comprising a plurality of instructions, which when executed by a computer, causes tile computer to execute the security trading compliance steps of:

providing a syntax in a rule definition language to declare at least one local variable in memory, wherein a local variable comprises a declaration for storage, in system memory, query data for temporary use of said query data during execution of a query;

providing a syntax in said language to declare at least one global variable, wherein a global variable comprises a declaration for storage, in system memory, data resident for use during execution queries; and providing a syntax through said language to declare pre-loaded memory tables.

21. The computer readable medium as set forth in claim 20, wherein the step of providing a syntax through said language to declare pre-loaded memory tables comprises the step of providing a syntax through a programming language to declare multi-dimensional associative arrays for accessing said multi-dimensional arrays.

22. The computer readable medium as set forth in claim 20, further comprising the steps of:

providing a syntax to declare an operation comprising a plurality of Boolean operands to execute a plurality of variables; and interpreting said syntax to execute Boolean operations subsequent to a final logical determination of said variables.

23. The computer readable medium as set forth in claim 20, further comprising the step of providing a syntax to mark a function as mutually exclusive.

24. The computer readable medium asset forth in claim 20, further comprising the step of providing a syntax to mark a function for execution a single time.

25. A server for security trading compliance comprising:

system memory comprising at least one pre-loaded memory table, a plurality of rules and a plurality of global datum, wherein said rules comprise computer readable instructions for execution in said computer and at least one global datum comprises parameters or values used to determine compliance with said rules wherein a query comprises a plurality of parameters and wherein said rules comprise at least one statement for evaluating said parameters of said query, said system memory for storing said global datum in said pre-loaded memory table;

a port for receiving, after loading said rules, local datum and global datum, at least one query for determining compliance with said rules, said query comprising at least one local datum used to determine compliance of a corresponding query with said rules;

said system memory for storing said local datum; and processor unit for executing, in response to said query, said rules including accessing said system memory to utilize said local datum and said global datum, wherein said server determines compliance with said rules from said system memory of said computer.

* * * * *